US 8,950,373 B2

(12) United States Patent
Notani (10) Patent No.: US 8,950,373 B2
(45) Date of Patent: Feb. 10, 2015

(54) ENGINE CONTROL DEVICE (75) Inventor: Hideya Notani, Kariya (JP)

(73) Assignee: Denso Corporation, Kariya (JP)

( * ) Notice: Subject to any disclaimer, the term of this patent is extended or adjusted under 35 U.S.C. 154(b) by 1103 days.

(21) Appl. No.: 12/952,448

(22) Filed: Nov. 23, 2010

(65) Prior Publication Data

US 2011/0120405 A1 May 26, 2011

(30) Foreign Application Priority Data

Nov. 23, 2009 (JP) ................................. 2009-265802

(51) Int. Cl.
*F02N 11/08* (2006.01)
*F02D 41/04* (2006.01)
*F02N 19/00* (2010.01)
*F02D 41/00* (2006.01)
*F02N 15/06* (2006.01)

(52) U.S. Cl.
CPC .......... *F02N 11/0848* (2013.01); *F02D 41/042* (2013.01); *F02N 19/005* (2013.01); *F02D 41/0002* (2013.01); *F02N 15/067* (2013.01); *F02N 2019/008* (2013.01); *Y02T 10/42* (2013.01)
USPC ..................................................... 123/179.3

(58) Field of Classification Search
CPC ..... F02N 11/00; F02N 11/08; F02N 11/0851; F02N 11/0855; F02N 11/0814; F02N 11/0844; F02N 11/087
USPC .................. 123/179.1, 179.25, 179.3, 179.4; 701/113
See application file for complete search history.

(56) References Cited

U.S. PATENT DOCUMENTS

| 5,970,937 | A  | * | 10/1999 | Casellato et al. | ........... 123/179.3 |
| 2001/0022166 | A1 | * | 9/2001 | Yamaguchi et al. | ....... 123/179.3 |
| 2002/0014216 | A1 | * | 2/2002 | Boegner et al. | ............ 123/179.3 |
| 2010/0083926 | A1 | * | 4/2010 | Okumoto et al. | .......... 123/179.4 |

FOREIGN PATENT DOCUMENTS

| JP | S58-12673 | 1/1983 | |
| JP | 02-199261 | 8/1990 | |
| JP | 2001-152822 | 6/2001 | |
| JP | 2001152822 A | * 6/2001 | .............. F01L 13/06 |
| JP | 2002-322925 | 11/2002 | |

(Continued)

OTHER PUBLICATIONS

Office Action (2 pages) dated Apr. 23, 2013, issued in corresponding Japanese Application No. 2012-208308 and English translation (2 pages).

(Continued)

*Primary Examiner* — Mahmoud Gimie
*Assistant Examiner* — Sizo Vilakazi
(74) *Attorney, Agent, or Firm* — Nixon & Vanderhye P.C.

(57) ABSTRACT

A ring gear is connected to a crank shaft of an engine. A pinion is placed to face to the ring gear. When the engine is started, an ECU performs cranking of the engine under a state where the ring gear and the pinion are in mesh. The ECU releases the mesh state of the ring gear and the pinion after completion of the cranking of the engine. In particular, the ECU performs dispersion control to increase a degree of dispersion of a mesh portion of the ring gear which is meshed with the pinion when the rotation of the ring gear is stopped according to the engine stop. The dispersion control prevents the mesh portion of the ring gear and the mesh portion of the pinion from progressing abrasion and avoiding defect.

8 Claims, 5 Drawing Sheets

(56) References Cited

FOREIGN PATENT DOCUMENTS

| | | |
|---|---|---|
| JP | 2006-242082 | 9/2006 |
| JP | P2007-092550 A | 4/2007 |

OTHER PUBLICATIONS

Japanese Office Action dated Jul. 24, 2012, issued in corresponding Japanese Application No. 2010-259373 with English translation.

* cited by examiner

ENGINE CONTROL DEVICE

CROSS-REFERENCE TO RELATED APPLICATION

This application is related to and claims priority from Japanese Patent Application No. 2009-265802 filed on Nov. 23, 2009, the contents of which are hereby incorporated by reference.

BACKGROUND OF THE INVENTION

1. Field of the Invention

The present invention relates to an engine control device capable of controlling an internal combustion engine to start by a starter.

2. Description of the Related Art

In general, an internal combustion engine mounted to a vehicle starts to rotate when a starter drives the crank shaft of the internal combustion engine, namely, the starter provides an initial rotation power to the crank shaft of the internal combustion engine. Specifically, a pinion fixed to the starter is pushed toward an axial direction of a rotary shaft of the pinion gear in order to mesh or engage the pinion with a ring gear which is fixed to the crank shaft of the engine. After this, when receiving an electric power, a starter motor of the starter starts to rotate. The rotation of the starter motor is transmitted to the ring gear, and the cranking operation of the internal combustion engine starts. The internal combustion engine thereby starts to rotate.

There is a conventional technique disclosed in Japanese patent laid open publication No. JP 2006-242082. Such a conventional technique adjusts the stop position of a piston in the corresponding cylinder (as a combustion chamber) of an internal combustion engine when the internal combustion engine is stopped. That is, the conventional technique controls the stop position of the piston at a desired position in the corresponding cylinder. After this, the conventional technique instructs the internal combustion engine to restart on receiving a request to restart the internal combustion engine.

However, the above conventional technique performing the stop position control of the piston involves a drawback that the stop piston of the piston has approximately the same stop position in the corresponding cylinder when the internal combustion engine is stopped, and the ring gear and the pinion become in mesh at approximately the same position, and abrasion occurs at the same mesh portion of the ring gear, that is, abrasion is concentrated at the same mesh portion of the teeth of the ring gear. The advance of abrasion often causes incorrect mesh state between the ring gear and the pinion. This would often cause unsmoothed starting of the internal combustion engine.

On the other hand, the above conventional drawback is also generated in a case without performing any stop position control. That is, the above conventional drawback also occurs when the rotation of the internal combustion engine is stopped without performing any stop position control because the piston in the cylinder under the compression stroke cannot travel over the top dead center (TDC) by the presence of a compression load of the cylinder in the compression stroke. As a result, because the piston is slightly returned toward the direction away from the TDC in the compression stroke, the piston always stops at approximately the same position in the cylinder in the compression stroke even if the stop position control is not performed.

Accordingly, when the internal combustion engine is stopped without performing any stop position control, it would also occur the above conventional drawback to advance abrasion of a specified portion of the teeth of the ring gear, like the above case which performs the stop position control.

SUMMARY OF THE INVENTION

It is an object of the present invention to provide an engine control device capable of suppressing abrasion of a mesh portion of the teeth of a ring gear from advancing, and thereby of smoothly and correctly performing cranking of an internal combustion engine by a starter.

To achieve the above purposes, the present invention provides an engine control device capable of performing cranking of an internal combustion engine in mesh state between a ring gear and a pinion, where the ring gear is connected to an output shaft of the internal combustion engine, and the pinion of a starter drives the internal combustion engine when the internal combustion engine starts to rotate. The ring gear faces the pinion of the starter. The engine control device releases the mesh state between the ring gear and the pinion after completion of the cranking. The engine control device has a dispersion control means. The dispersion control means performs a dispersion control to increase the degree of dispersion of a mesh portion of the ring gear with which a mesh portion of the pinion is meshed together when a rotation of the ring gear is stopped according to the stop of the operation of the internal combustion engine.

In summary, because the stop position in rotation of the output shaft of the internal combustion engine approximately has the same position when the internal combustion engine is stopped, the ring gear, which is meshed with the pinion, has the same mesh portion which is approximately within a specified range in mesh state before the internal combustion engine is restarted. In order to prevent the mesh portion of the ring gear with the pinion from being the same portion when the internal combustion engine is stopped, the engine control device according to the present invention forcedly increases the degree of dispersion of the mesh portion of the ring gear which faces the pinion. This makes it possible to increase the degree of dispersion of the mesh portion in the teeth of the ring gear facing the mesh portion of the pinion. It is therefore possible to suppress abrasion which is partially generated in the specified same portion in the entire teeth of the ring gear from being advanced. The engine control device according to the present invention correctly performs the engagement in mesh state between the ring gear and the pinion, and correctly control the cranking of the internal combustion engine by the starter.

In the engine control device as another aspect of the present invention, the dispersion control means performs the dispersion control to increase the degree of dispersion of the mesh portion of the ring gear facing the pinion by enlarging a distribution of the mesh portion of the ring gear when compared with the mesh portion of the ring gear obtained without performing the dispersion control.

Further, the engine control device as another aspect of the present invention further has a target setting means capable of setting a target mesh portion of the ring gear facing the mesh portion of the pinion based on a previous mesh portion of the ring gear obtained by a previous engine stop which is prior to the last engine stop. The dispersion control means performs the dispersion control to increase the degree of dispersion of the mesh portion of the ring gear by setting the target mesh portion to the mesh portion of the ring gear which faces the pinion.

As described above, it is possible for the engine control device according to the present invention to easily increase the degree of dispersion of the mesh portion of the ring gear which faces the pinion.

In general, the engine control device often controls the stop position of the piston in the cylinder of the internal combustion engine when the internal combustion engine is stopped. The engine control device according to the present invention can adjust the mesh portion of the pinion gear facing the pinion (the stop position of the piston) which is different from the mesh portion of the ring gear (or the stop position of the piston) when the internal combustion engine is stopped without any control.

It is acceptable for the engine control device to have a configuration in which the dispersion control is performed by selecting whether or not the stop position control of the piston is performed. In this case, the condition to perform the stop position control of the piston is determined based on the types of the request to stop the internal combustion engine. (for example, one type of the request to stop the engine is generated by a system such as by turning off the IG switch, and the other type of the request to stop the engine is generated by the idling stop control.)

In order to expand the distribution of the mesh portion of the ring gear facing the mesh portion of the pinion, there is a following preferable case. The dispersion control means as another aspect of the present invention performs the dispersion control to increase the degree of dispersion of the mesh portion of the ring gear by adjusting a compression load of a cylinder in a compression stroke when the internal combustion engine is stopped. In particular, the cylinder of the internal combustion engine has various types of valves capable of adjusting a quantity of a fuel gas to be supplied into the cylinder (as a combustion chamber) of the internal combustion engine.

This makes it possible to decrease the compression load of the cylinder in the stroke in which the valves are simultaneously closed when the internal combustion engine is stopped. It is thereby possible to disperse the stop position of the piston in the cylinder of the internal combustion engine. This makes it possible to disperse the rotary-angle position of the output shaft (or the crank angle position) of the internal combustion engine, and further to increase the dispersion of the mesh portion of the ring gear facing the mesh portion of the pinion when the internal combustion engine is stopped.

The above vales are the intake valve, the exhaust valve, and the throttle valve. The intake valve and the exhaust valve are placed at the intake port and the exhaust port, respectively, communicating with the cylinder as the combustion chamber of the internal combustion engine. The throttle valve adjusts the cross sectional area of the intake passage. In more detail, when the valves are the intake valve and the exhaust valve, the engine control device forcedly open the intake valve or the exhaust valve of the cylinder in the compression stroke at the TDC or the position near the TDC in the compression stroke when the internal combustion engine is stopped in order to decrease the compression load of the cylinder in the compression stroke. When the internal combustion engine is stopped, it is better for the engine control device to open the intake valve or the exhaust valve in the power stroke in addition to the intake valve or the exhaust valve of the cylinder in the compression stroke.

In addition, because there is a difference in quantity between air to be forced into the cylinder (as the combustion chamber) when the throttle valve is opened and air to be forcedly supplied into the cylinder (as the combustion chamber) when the throttle valve is closed, and the compression load of the cylinder in the compression stroke is changed by adjusting the quantity of the intake air, the engine control device according to the present invention instructs the throttle valve to open or close in order to decrease the compression load of the cylinder in the compression stroke.

The forward rotation and reverse rotation are alternately occurred during the inertial rotation of the internal combustion engine after the internal combustion engine is stopped, the rotation of the internal combustion engine can be immediately stopped by mating the pinion gear with the ring gear when the internal combustion engine reversely rotates during the inertial rotation of the internal combustion engine.

The engine control device as another aspect of the present invention, further has a mesh control means, and a rotation control means. The mesh control means is capable of meshing the pinion with the ring gear during inertial rotation of the internal combustion engine after the internal combustion engine is stopped, The rotation control means is capable of rotating the pinion by the rotation drive means after receiving a request to start the internal combustion engine. The dispersion control means performs the dispersion control to set the target mesh portion to the mesh portion of the ring gear by meshing the pinion to the ring gear during reverse rotation during inertial rotation of the internal combustion engine by the rotation control means. The above structure makes it possible to control the stop position in rotation of the output shaft (or the crank shaft) of the internal combustion engine with high accuracy. This further makes it possible to increase the dispersion of the mesh portion of the ring gear facing the mesh portion of the pinion.

Advancing abrasion of the teeth part of the ring gear causes the difficulty of correctly meshing the ring gear with the pinion. This increases the period of time necessary to completing the cranking of the internal combustion engine. In order to avoid this drawback, the engine control device as another aspect of the present invention further has a starting-capability detection means. The starting-capability detection means is capable of detecting decreasing ability to start the internal combustion engine. The dispersion control means performs the dispersion control when the starting-capability detection means detects decreasing of the ability to start the internal combustion engine. This makes it possible to estimate the advance of abrasion in the teeth of the ring gear, and to perform the dispersion control when there is a high possibility to increase the degree of dispersion of the mesh portion of the ring gear facing the mesh portion of the pinion.

In the engine control device as another aspect of the present invention, the internal combustion engine has an automatic engine stop and restart function capable of automatically stopping the operation of the internal combustion engine when a predetermined automatic engine stop condition is satisfied, and automatically start the internal combustion engine by performing the cranking of the internal combustion engine by the starter. The engine control device further comprises request judgment means capable of judging whether the request to stop the internal combustion engine is generated by satisfying the predetermined automatic engine stop condition or by a system start other than the function to automatically start and restart the internal combustion engine. The dispersion control means performs the dispersion control based on the judgment result of the request judgment means.

This makes it possible to correctly select whether or not the dispersion control is performed based on the following cases (c1) and (c2):

(c1) when the internal combustion engine is stopped by the system start, for example, when the vehicle driver turns off the IG switch; and (c2) when the internal combustion engine is stopped by the idling stop control.

In the engine control system equipped with the engine control device and the idling stop control, it is necessary for engine control device to start the internal combustion engine as soon as possible according to the request to restart the internal combustion engine after the engine stop.

The engine control device according to the present invention performs the dispersion control when the system-start operation such as turning-off of the IG switch generates the request to stop the internal combustion engine. On the other hand, the engine control device according to the present invention does not perform the dispersion control when the idling stop control generates the request to stop the internal combustion engine. This makes it possible to suppress abrasion of the mesh part of the teeth of the ring gear from being advanced while maintaining the engine start-capability after the internal combustion engine is stopped.

BRIEF DESCRIPTION OF THE DRAWINGS

A preferred, non-limiting embodiment of the present invention will be described by way of example with reference to the accompanying drawings, in which.

DETAILED DESCRIPTION OF THE PREFERRED EMBODIMENTS

Hereinafter, various embodiments of the present invention will be described with reference to the accompanying drawings. In the following description of the various embodiments, like reference characters or numerals designate like or equivalent component parts throughout the several diagrams.

First Embodiment

A description will be given of the engine control device according to the first embodiment of the present invention with reference to FIG. 1 to FIG. 7.

Figure 1:
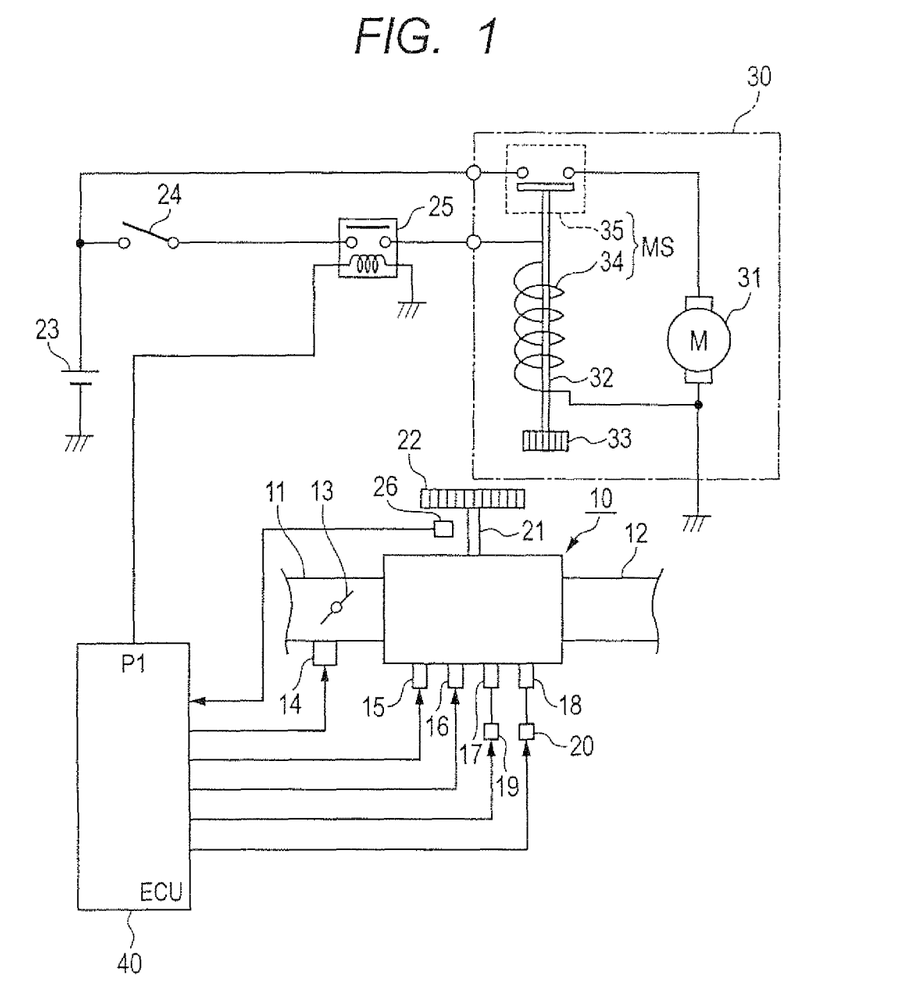
FIG. 1 is a view showing a schematic entire structure of an engine control system equipped with an engine control device for an internal combustion engine according to a first embodiment of the present invention.

For example, an engine control system has an engine control device capable of controlling the operation of engine stop and start. The engine control system has an electric control unit (ECU) capable of controlling a fuel quantity in a fuel injection, and an ignition timing, an idling stop operation, etc. The engine control device according to the first embodiment is realized by the ECU. FIG. 1 is a view showing a schematic entire structure of the engine control system equipped with the engine control device for an internal combustion engine according to the first embodiment of the present invention.

As shown in FIG. 1, an intake pipe 11 and an exhaust pipe 12 are connected to the internal combustion engine 10 (hereinafter, referred to as the "engine 10"). A throttle valve 13 is mounted to the intake pipe 11 in order to adjust a quantity of intake air into a cylinder. The throttle valve 13 serves as the means of adjusting air quantity driven by a throttle actuator 14 composed of an electric motor, etc. The throttle valve 13 is opened and closed by the throttle actuator 14. The throttle actuator 14 is equipped with a throttle sensor which detects the degree to open the throttle valve 13.

The engine 10 is equipped with injectors 15 and igniters (not shown). Each of the injector 15 serves as the fuel injection means to supply a fuel to the corresponding cylinder. Each of the igniters generates a spark at the spark plug 16 mounted to the cylinder.

The intake port of the engine 10 has an intake valve 17. The exhaust port of the engine 10 has an exhaust valve 18. The intake valve 17 and the exhaust valve 18 are mechanically driven, opened and closed according to the rotation of the crank shaft 21. The crank shaft 21 serves as the output shaft of the engine 10. Specifically, a cam shaft (omitted from drawings) is rotated by the rotation of the crank shaft 21, and a cam fixed to the cam shaft is then rotated. The intake valve 17 and the exhaust valve 18 are opened and closed according to the rotation of this cam.

A valve driving mechanism 19 is mounted to the intake valve 17. A valve driving mechanism 20 is also mounted to the intake valve 18. These valve driving mechanisms 19 and 20 serve as valve timing adjusting means capable of adjusting the timing to open and close the intake valve 17 and the exhaust valve 18. The valve driving mechanism 19 for the intake valve 17 adjusts the timing to open and close the intake valve 17 at an advance angle side or a delay angle side. The valve driving mechanism 20 for the exhaust valve 20 adjusts the timing to open and close the exhaust valve 18 at an advance angle side or a delay angle side.

A starter 30 of the engine 10 has a starter motor 31 which serves as a rotary driving means to drive the engine 10. A rotary shaft of the starter motor 31 has a pinion shaft 32. The pinion shaft 32 is rotated when the electric power is supplied to the starter motor 31. A pinion 33 is fixed to a front end of the pinion shaft 32. A ring gear 22 which is linked to the crank shaft 21 of the engine 10 is placed at a position opposed to the position at which the pinion 33 is fixed.

When a piston of the engine 10 performs a reciprocating motion in the corresponding cylinder, the crank shaft 21 is rotated, and the ring gear 2 is thereby rotated.

The starter 30 has a magnet switch unit MS which is placed between a battery 23 and the electric motor 31. The magnet switch unit MS is composed of a coil 34 and a switch 35. The coil 34 is placed around the pinion shaft 32. The switch 35 is placed at one end of the pinion shaft 21 which is opposite to the other end at which the pinion 33 is placed. An ignition (IC) switch 24 and a SL (solenoid) drive relay 25 are placed between the coil 34 and the battery 23.

The pinion 33 is not meshed with the ring gear 22 when no electric power is supplied to the coil 34 of the starter 30

For example, when a vehicle driver turns on the IG switch from off state to on state in order to start the engine 10, the SL drive relay 25 is turned on from turned off based on a control signal transferred from the ECU 40. Magnetic force is generated in the coil 34 of the magnet switch unit MS because electric power is supplied to the coil 34. The pinion shaft 32 is pushed toward the ring gear 22 by the magnet force generated in the coil 34. The pinion 33 is moved to the ring gear 22 until the pinion gear 33 is completely engaged with the ring gear 22.

When moved, the pinion shaft 32 pushes the switch 35 of the magnet switch MS unit, and the switch 34 is thereby turned on. When the switch is turned on, the electric power is supplied to the starter motor 31 through the switch 35. The starter motor 31 starts to rotate when receiving the electric power from the battery 23 through the switch 35. The cranking of the engine 10 is thereby started.

In the engine start, when the rotary speed of the engine 10, namely, the rotary speed of the ring gear 22 exceeds the rotary speed of the pinion 33 and the pinion 33 is driven by the ring gear 22, the pinion shaft 32 is moved toward the direction which is opposite to the ring gear 22 side, and the pinion 33 is completely released from the ring gear 22. This prevents the pinion 33 from being driven by the rotary power of the engine 10.

The engine control system having the engine control device according to the first embodiment further has various types of sensors such as an crank angle sensor 26. The crank angle sensor 26 detects a crank angle of the crank shaft every a predetermine crank angle (for example, every 30° CA period) of the crank shaft of the engine 10, and transfers a crank angle signal of a rectangle waveform.

The ECU 40 is equipped with a microcomputer, which is a known device and easily available in the commercial market. The ECU 40 performs various types of engine control processes such as processes of adjusting a quantity of an intake air and a quantity of a fuel injection, an idling stop control process, a control process of driving the starter. The ECU 40 has an output port P1 through which on/off signals to control the SL drive relay 25. The ECU 40 switches the condition to supply electric power to the starter motor 31 and the coil 34 of the starter 30 based on the control signals transferred through the output port P1.

A description will now be given of the idling stop control performed by the engine control system equipped with the engine control device having the above configuration.

When a predetermined condition to stop the idling of the engine 10 is satisfied during the idling of the engine 10, the ECU 40 instructs the engine 10 to be automatically stopped. After this, when a predetermined condition to restart the engine 10 is satisfied, the ECU 40 instructs the engine to restart. For example, the condition to stop the operation of the engine 10 involves at least one or more of cases:

(a1) when the stroke of the acceleration pedal depressed by the vehicle driver is zero (when the engine enters the idling);

(b1) when the vehicle driver depresses the brake pedal of the vehicle;

(c1) when the vehicle speed is decreased to not more than a predetermined value.

The condition to restart the engine 10 involves at least one or more of cases:

(a2) when the vehicle drive depresses the acceleration pedal of the vehicle;

(b2) when a stroke of the brake pedal depressed by the vehicle driver becomes zero; and (c2) when the state of charge of the battery 23 of the vehicle is decreased to a predetermined value.

When the condition to restart the operation of the engine 10 is satisfied after completion of the stop of the engine 10, the starter 30 initiates the cranking of the engine 10. Specifically, the ECU 40 transfers a control signal to the SL drive relay 25 in order to turn on the SL drive relay 25 after receiving a request to restart the engine 10. When receiving the control signal transferred from the ECU 40, an electric power is supplied to the coil 34 through the SL drive relay 25. The coil thereby generates magnetic force and the pinion 33 is pushed toward the ring gear 22. Finally, the pinion 33 is in mesh state with the ring gear 22. After this, the pinion 33 starts to rotate when an electric power is supplied to the starter motor 31, and the ring gear 22 rotates according to the rotation of the pinion 33. The cranking is thereby initiated to restart the operation of the engine 10.

By the way, when the engine 10 is stopped, the stop position of the piston in the cylinder becomes approximately the same crank angle position. This means that a specified portion of the teeth of the ring gear 22 and a specified portion of the teeth of the pinion 33 are in mesh state together when the ring gear 22 is stopped according to the engine stop.

Figure 2:
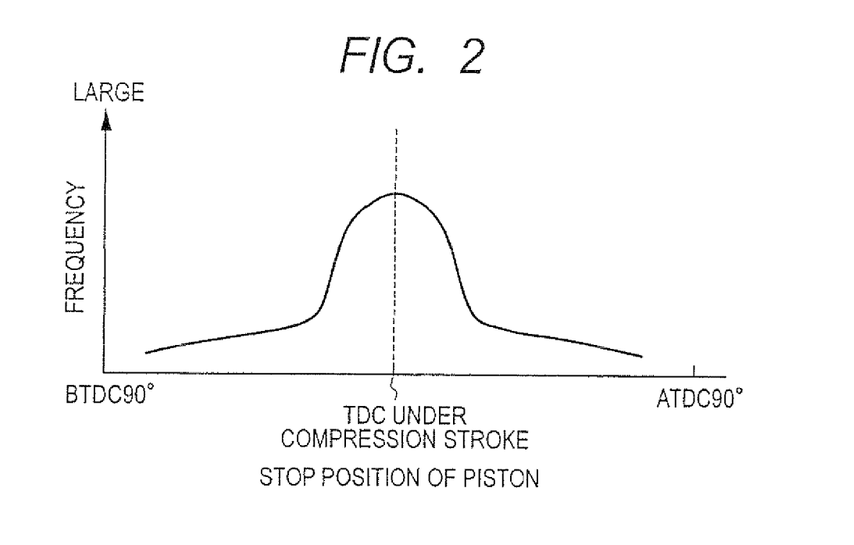
FIG. 2 is a view showing a distribution of a stop position of the piston in a cylinder under a compression stroke in the internal combustion system equipped with the engine control device the according to the first embodiment of the present invention.

FIG. 2 is a view showing a distribution of a stop position of the piston in the cylinder under a compression stroke in the internal combustion system equipped with the engine control device according to the first embodiment.

In FIG. 2, the horizontal axis indicates the stop position of the piston in the cylinder (or the position of the crank angle), and the vertical axis indicates the frequency of the stop position of the piston in the cylinder. In particular, FIG. 2 shows the case when the engine 10 is stopped without performing any stop position control to adjust the stop position of the piston in the cylinder.

As shown in FIG. 2, the stop position of the piston in the cylinder under the compression stroke when the engine is stopped has the maximum frequency value at a position near an intermediate point between the TDC (Top Dead Center) and the BDC (Bottom Dead Center) in the cylinder under the compression stroke, excepting irregular case. The stop position of the piston has a distribution within a range of approximately 40° CA around an intermediate point between the TDC and the BDC in the compression stroke, That is, the stop position of the piston in the cylinder under the compression stroke has a distribution range of ±20° CA counted from an intermediate point between the TDC and the BDC in the compression stroke. This indicates difficulty for the piston to travel over the TDC because the compression load of the cylinder becomes large when the cylinder is in the compression stroke immediately before the engine 10 is stopped. As a result, the piston is stopped at a position near an intermediate point between the TDC and the BDC in the compression stroke after returned toward the direction away from the TDC in the compression stroke. That is, when the engine 10 is stopped, a reciprocating cycle of the piston is stopped according to the balance between the rotary energy of the engine 10 and the compression load of the cylinder.

For example, in case of an inline-four engine, the stop position of each of the first to fourth pistons in the first to fourth cylinders has an interval of 180° CA. Specifically, when the first cylinder, the second cylinder, the third cylinder, and the fourth cylinder are ignited in order, the stop position of the first to fourth pistons have 0° CA, 180° CA, 360° CA (=0° CA), and 540° CA (=180° CA), respectively. That is, the first piston of the first cylinder and the third piston of the third cylinder have the apparent same stop position. Further, the second piston of the second cylinder and the fourth piston of the fourth cylinder have the apparent same stop position.

Accordingly, the inline-four engine has the two stop positions of the pistons when the engine stops based on a balance between the rotary energy of the engine 10 and the compression load of the cylinders.

In addition, because the inline-four engine has the two stop positions of the pistons when the engine is stopped, the portion where the ring gear 22 and the pinion 33 are in mesh state together are limited with the two positions.

Figure 3:
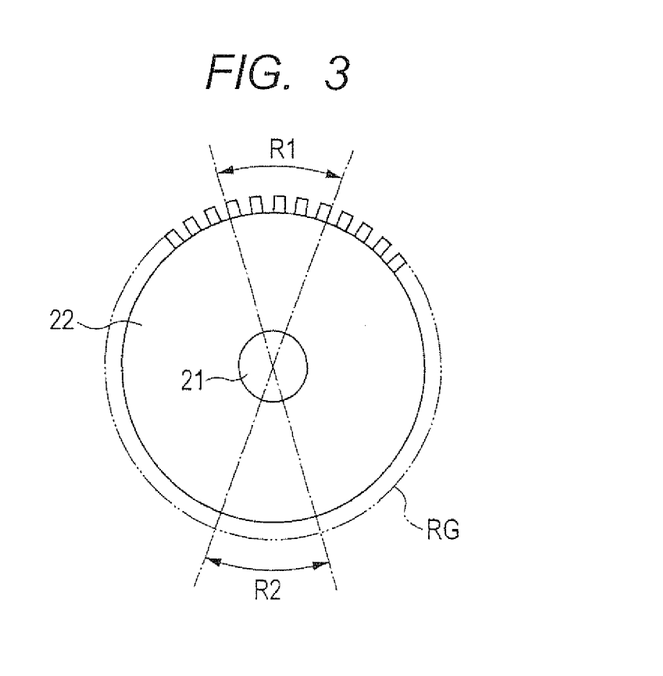
FIG. 3 is a view showing two mesh portions R1 and R2 between a ring gear and a pinion in the engine control system equipped with the engine control device according to the first embodiment of the present invention.

FIG. 3 is a view showing two mesh portions R1 and R2 between the teeth of the ring gear 22 and the pinion 33 in the engine control system equipped with the engine control device according to the first embodiment.

As shown in FIG. 3, the mesh portion between the ring gear 22 and the pinion 33 are limited in the narrow ranges R1 and R2, which are opposed to each other, in the entire range RG of the teeth of the ring gear 22.

When the mesh portion between the ring gear 22 and the pinion 33 is limited within the narrow ranges R1 and R2 in the ring gear 22, there is a problem to advance abrasion of the teeth and defect of the teeth in the specified ranges R1 and R2 in the ring gear 22. That is, when the pinion 33 is pushed to the ring gear 22 in order to engage the pinion 33 with the ring gear 22 together, there is a possibility of colliding the end part of the teeth of the pinion 33 and the end part of the teeth of the ring gear 22. This would cause abrasion or defect of the teeth of the pinion 33 and the ring gear 22. In particular, the pinion 33 is made of hard material when compared with the material of the ring gear 22. In this case, the defect of the teeth of the ring gear 22 easily occurs when the ring gear 22 collides with the pinion 33.

In addition, after completion of the engagement between the pinion 33 and the ring gear 22, the pinion 33 starts to be rotated by the starter motor 31. This has a possibility of advancing abrasion of the teeth of the pinion gear 33 and the ring gear 22 by the collision of the teeth of the pinion 33 and the ring gear 22 when the pinion 33 starts to be rotated by the starter motor 31.

When such abrasion occurs in the limited range of the ring gear 22, the abrasion and defect are further advanced at the limited range of the teeth of the ring gear 22. In this case, there is a possibility to correctly engage the ring gear 22 with the pinion 33. When the engagement between the ring gear 22 and the pinion 33 are not correctly performed, there is a possibility of correctly performing the cranking of the engine 10.

In order to avoid the above drawbacks, the engine control device according to the first embodiment performs the dispersion control to expand the degree of dispersion of the mesh portion between the teeth of the ring gear 22 and the pinion 33. The ECU 40 as the engine control device according to the first embodiment performs the dispersion control when the ring gear 22 is stopped according to the engine stop.

That is, when the rotation of the ring gear 22 is stopped, the ECU 40 forcedly expands the degree of dispersion of the mesh portion of the teeth of the ring gear 22 with the teeth of the pinion 33. Specifically, the ECU 40 performs the dispersion control so that the intake valve 17 is forcedly opened at the TDC or around the TDC in the cylinder under the compression stroke at the timing immediately before the engine is stopped when receiving the request to stop the engine 10. This control decreases the compression load of the cylinder in the compression stroke, and can thereby expand the degree of dispersion of the mesh portion of the teeth of the ring gear 22 with the teeth of the pinion 33. That is, in the cylinder in the compression stroke when the engine 10 is stopped, the stop position of the piston in the cylinder is expanded toward the advance angle side or the delay angle side around an intermediate point between the TDC and the BDC in the compression stroke.

The dispersion control to disperse the stop position of the piston in the cylinder can forcedly expand the distribution range of the mesh portion where the teeth of the ring gear 22 and the teeth of the pinion 33 are in mesh state together.

In order to open the intake valve 17 at the TDC in the compression stroke of the cylinder, it is possible to change the opening timing to open the intake valve 17 toward the delay angle side when the valve driving mechanisms 19 and 20 are a phase adaptation type. On the other hand, it is possible to switch the cam when the valve driving mechanisms 19 and 20 are a cam switch type.

Figure 4A:
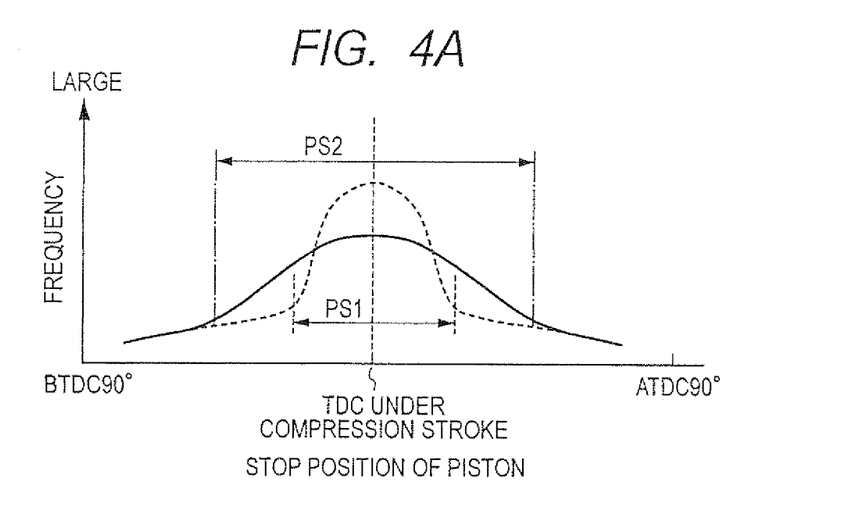
FIG. 4A is a view showing a dispersion control to increase a distribution of the stop position of the piston in the cylinder of the engine according to the first embodiment of the present invention.
Figure 4B:
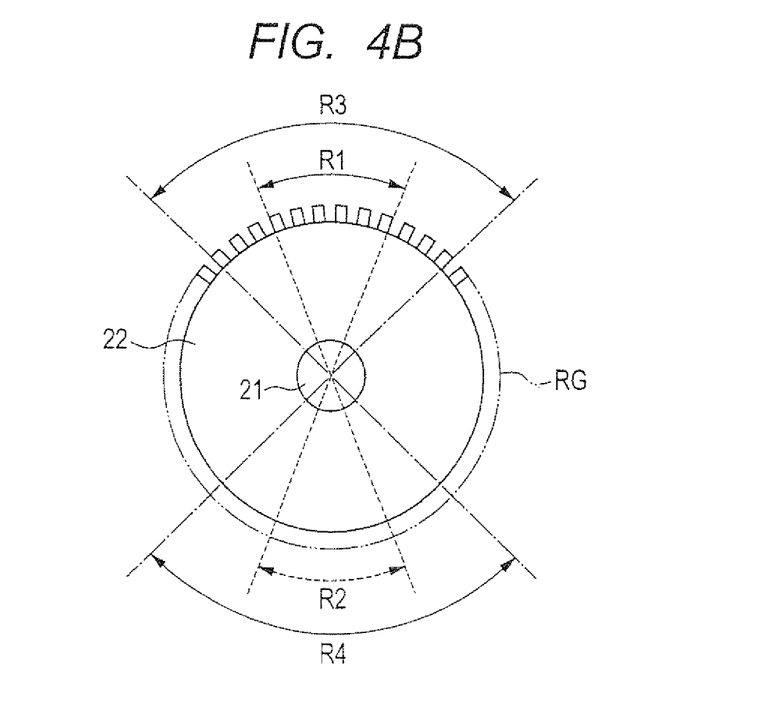
FIG. 4B is a view showing an allowable range of the mesh portion between the ring gear and the pinion in the engine control system equipped with the engine control device according to the first embodiment of the present invention.

FIG. 4A is a view showing the dispersion control to expand the stop position of the piston in the cylinder of the engine 10 according to the first embodiment. FIG. 4B is a view showing allowable mesh portions R3 and R4 of the ring gear 22 with the pinion 33 in the engine control system equipped with the engine control device according to the first embodiment. In FIG. 4A, the horizontal line indicates the stop position of the piston in the cylinder, and the vertical line indicates the frequency of the stop position of the piston in the cylinder.

FIG. 4A shows the case (as the former case) of not opening the intake valve 17 in the cylinder at the TDC in the compression stroke immediately before the rotation of the engine 10 is stopped. In this case, the stop position of the piston in the cylinder under the compression stroke when the engine 10 is stopped has the maximum frequency at a position near an intermediate point between the TDC and the BDC in the compression stroke designated by the dotted line in FIG. 4A, and the stop position of the piston in this cylinder is distributed in the range PS1 (for example, approximately 40° CA) around an intermediate point between the TDC and the BDC in the compression stroke, excepting irregular case.

On the other hand, in the case (as the latter case) of opening the intake valve 17 in the cylinder at the TDC in the compression stroke immediately before the rotation of the engine 10 is stopped, the stop position of the piston in the cylinder in the compression stroke when the engine 10 is stopped has the maximum frequency at a position near an intermediate point between the TDC and the BDC in the compression stroke designated by the solid line in FIG. 4A, but the stop position of the piston in the cylinder in the compression stroke has a low frequency at a position near an intermediate point between the TDC and the BDC in the compression stroke, when compared with the former case designated by the dotted line in FIG. 4A.

In the latter case, as shown in FIG. 4A, the stop position of the piston in the cylinder has the distribution PS2 (for example, 80° CA) around an intermediate point between the TDC and the BDC in the compression stroke which is wider than the distribution range PS1.

As a result of expanding the dispersion of the stop position of the piston in the cylinder, as shown in FIG. 4B, the engagement range between the ring gear 22 and the pinion 33 has the ranges (mesh portions) R3 and R4 which are expanded from the ranges (mesh portions) R1 and R2.

In particular, according to the first embodiment, when receiving the request to stop the engine 10, the ECU 40 detects whether the request is generated by turning off the IG switch 24 by the vehicle driver or the request is generated by the satisfaction of the automatic engine stop condition in the idling stop control. The ECU 40 judges whether or not the dispersion control is performed based on the detection result.

In more detail, the ECU 40 does not perform the dispersion control to expand the degree of dispersion of the stop position of the piston in the cylinder when the request is caused by turning off the IG switch 24. In this case, the ECU 40 does not perform the control to adjust the stop position of the piston in the cylinder in order to stop the rotation of the engine 10 (the reciprocating motion of the piston) in a natural course of events.

In addition, when the engine 10 is stopped, the ECU 40 controls the intake valve 17 to be opened at the TDC in the cylinder in the compression stroke in order not to expand the distribution range of the stop position of the piston in the cylinder.

On the other hand, when the request to stop the rotation of the engine 10 is generated by the idling stop control, the ECU 40 performs the process of controlling the stop position of the piston in the cylinder under the compression stroke so that the stop position of the piston becomes a predetermined position PT1 which is different from a position near an intermediate point between the TDC and the BDC in the compression stroke when the engine 10 is stopped.

This control process changes the stop position of the piston in the cylinder when the engine 10 is stopped under the idling stop control, which is different from the stop position of the piston in the cylinder when the engine 10 is stopped by turning off the IG switch 24. As a result, it is possible for the ECU 40 to expand the degree of distribution of the stop position of the piston in the cylinder under the idling stop control when the engine 10 is stopped.

A description will now be given of the stop position control process of the piston in the cylinder performed by the ECU 40 which serves as the engine control device according to the first embodiment.

The ECU 40 according to the first embodiment controls the piston to stop at a predetermined position PT1 in the cylinder during the compression stroke when the engine 10 is stopped based on various types of control processes such as the load control of an alternator (not shown), the opening/closing control of the intake valve 17 and the exhaust valve 18, and the opening control of the throttle valve 13. In particular, the predetermined position PT1 of the piston is different from a position near an intermediate point between the TDC and the BDC of the piston in the cylinder under the compression stroke. That is, according to the first embodiment, the predetermined position PT1 of the piston in the cylinder is the position of the piston (for example, the degree of 60° CA before TDC) at which the first ignition can be performed in the cylinder in the next engine restart. That is, the ECU 40 controls the piston in the cylinder so that the stop position of the piston is changed when the engine is stopped under the idling stop control and the IG switch off control while keeping the capability to restart the engine 10 in the next engine restart.

Figure 5:
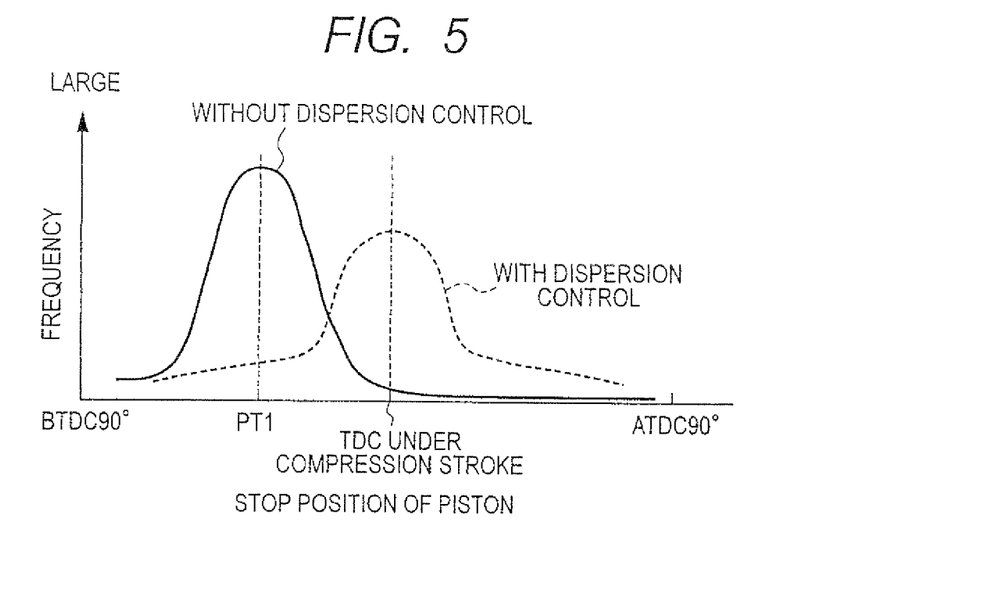
FIG. 5 is a view showing a distribution of the stop position of the piston in the cylinder under the compression stroke when the stop position control is performed.

FIG. 5 is a view showing a distribution of the stop position of the piston in the cylinder under the compression stroke when the ECU 40 performs the stop position control. In FIG. 5, the solid curve is obtained when the ECU 40 performs the stop position control, and the dotted line is obtained without the stop position control (when the engine 10 is stopped without performing any control). In the same manner as FIG. 2, the horizontal axis in FIG. 5 indicates the stop position of the piston in the cylinder, and the vertical axis in FIG. 5 indicates the frequency of the stop position of the piston in the cylinder.

As designated by the solid curve in FIG. 5, the stop position of the piston in the cylinder when the ECU 40 performs the stop position control has a different distribution when compared with the stop position of the piston designated by the dotted curve without performing any stop position control. In more detail, the solid curve indicates that the predetermined position PT1 has the maximum frequency and the distribution of the frequency is set within the degree of approximately 40° CA around the predetermined position PT1, excepting irregular case.

Figure 6:
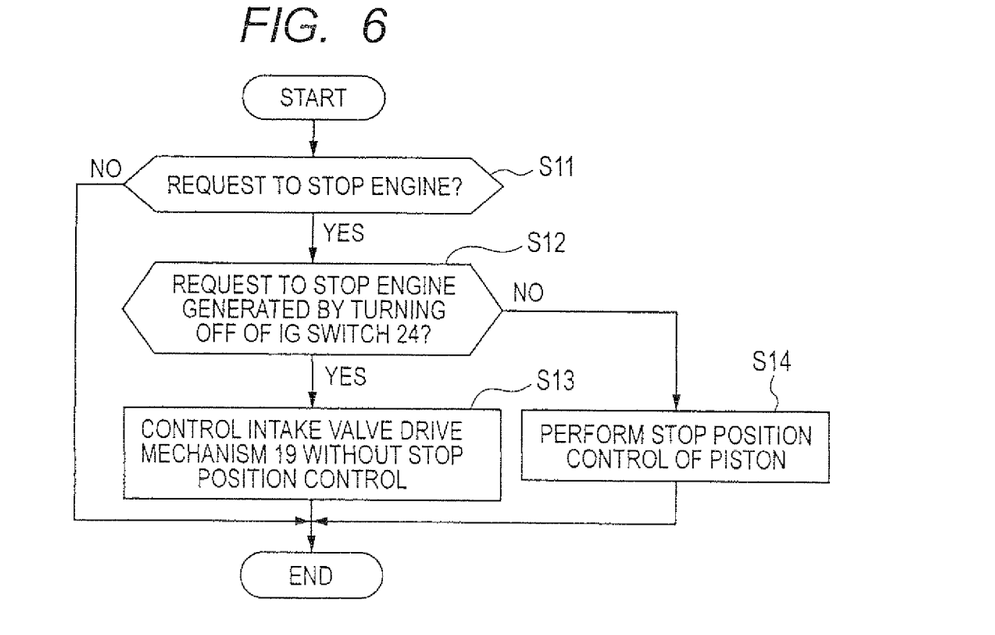
FIG. 6 is a flow chart showing the dispersion control to disperse the stop position of the piston in the cylinder.

FIG. 6 is a flow chart showing the dispersion control to disperse the stop position of the piston in the cylinder under the compression stroke when the ECU 40 performs the stop position control. The ECU 40 performs the process shown in FIG. 6 every predetermined period of time.

In the flow chart shown in FIG. 6, the ECU 40 detects whether or not the request to stop the engine 10 is generated (step S11).

When the detection result in step S11 indicates that the presence of the request to stop the engine 10 ("YES" in step S11), the operation flow goes to step S12.

In step S12, the ECU 40 judges whether or not the request to stop the engine 10 is generated by switching the IG switch 24 from on state to off state. When the judgment result in step S12 indicates that the request is generated by switching to off state of the IG switch 24 ("YES" in step S12), the operation flow goes to step S13.

In step S13, the ECU 40 controls the valve driving mechanism 19 at the intake valve 17 side so that the intake valve 17 of the cylinder in the compression stroke is opened at the TDC in the compression stroke before the engine 10 is stopped. That is, the ECU 40 decreases the compression load of the cylinder under the compression stroke in order to disperse the stop position of the piston in the cylinder around an intermediate point between the TDC and the BDC in the compression stroke. After completion of the step S13, the ECU 40 completes the process shown in FIG. 6.

On the other hand, when the judgment result in step S12 indicates that the request is generated by satisfying the condition to automatically stop the engine 10 under the idling stop control ("NO" in step S12), the operation flow goes to step S14. In step S14, the ECU 40 performs the stop position control of the piston when the engine 10 is stopped.

In the first embodiment, the ECU 40 controls the piston to stop at the predetermined position PT1 in the cylinder during the compression stroke when the engine 10 is stopped based on at least one of the control processes such as the load control of an alternator (not shown), the opening/closing control of the intake valve 17 and the exhaust valve 18, and the degree to open the throttle valve 13. It is thereby possible to increase a response to restart the engine 10 at next time.

The ECU 40 as the engine control device according to the first embodiment has the following superior effects.

Because the ECU 40 forcedly increases the degree of dispersion of the portion of the ring gear 22 to the portion of the pinion 33 when the rotation of the ring gear 22 is stopped by the engine stop, it is possible to increase the dispersion of the portion of the teeth of the ring gear 22 which is engaged with the portion of the teeth of the pinion 33 when the rotation of the ring gear 22 is stopped. This control makes it possible to suppress the same portion of the teeth of the ring gear 22 from abrasion or generating defect. This also possible to correctly perform the engagement between the ring gear 22 and the pinion 33 for a long period of time while decreasing abrasion and avoiding defect. Thus, the ECU 40 as the engine control device according to the first embodiment of the present invention can correctly control the cranking of the engine 10 by using the starter 30.

Still further, because the ECU as the engine control device according to the first embodiment increases the degree of dispersion of the stop position of the piston in the cylinder in the compression stroke by expanding the distribution of the part of the teeth of the ring gear 22 which is engaged with the part of the teeth of the pinion 33, it is possible to relatively and easily expand the dispersion of the engagement part of the teeth of the ring gear 22 which is engaged with the part of the teeth of the pinion 33.

When the engine 10 is stopped, the ECU 40 as the engine control device according to the first embodiment adjusts the compression load of the cylinder which enters the compression stroke in order to expand the distribution of the part at which the teeth of the ring gear 22 and the teeth of the pinion are in mesh state. In more detail, when the engine 10 is stopped, the ECU 40 instructs the intake valve 17 of the cylinder entering the compression stroke to be opened at the TDC in the compression stroke when the engine 10 is stopped. This makes it possible to easily expand the distribution of the mesh portion at which the teeth of the ring gear 22 and the teeth of the pinion are in mesh state together.

Further, in the engine stop based on the request to stop the engine 10 generated by the system to turn off the IG switch 24, the ECU 40 adjusts the compression load of the cylinder in the compression stroke. This can expand the distribution of the portion at which the teeth of the ring gear 22 and the teeth of the pinion are in mesh state together.

On the other hand, in the engine stop generated by the idling stop control, the ECU 40 does not expand the distribution of the mesh portion where the teeth of the ring gear 22 and the teeth of the pinion are in mesh state together.

As described above, it is therefore possible for the ECU 40 as the engine control device of the first embodiment to suppress abrasion of the ring gear 22 from being advanced while maintaining the easy engine restart after the engine stop.

Further, when the request to stop the engine 10 is generated by the system to turn off the IG switch 24, the rotation of the engine 10 is stopped without performing any stop position control to adjust the stop position of the piston in the cylinder under the compression stroke (as the former case). On the other hand, when the engine 10 is stopped under the idling stop control, the ECU 40 performs the stop position control of the piston in the cylinder which enters the compression stroke (as the latter case). This makes it possible to have a different stop position of the piston in the cylinder between the above former case and the latter case. This makes it further possible to expand the distribution of the mesh portion at which the teeth of the ring gear 22 and the teeth of the pinion 33 are in mesh state together.

Second Embodiment

A description will be given of the engine control system equipped with the engine control device according to the second embodiment of the present invention, which has the following configuration.

The engine control system further has a stat detection means to detect decreasing of a starting-capability to start the engine 10. When the stat detection means detects decreasing of the starting-capability to start the engine 10, the ECU 40 as the engine control device performs the dispersion control.

Specifically, it becomes difficult to correctly engage the teeth of the ring gear 22 with the teeth of the pinion 33 when abrasion of the teeth of the ring gear 22 is advanced. As a result, the period of time necessary to perform the cranking of the engine 10 becomes long.

In the second embodiment, the ECU 40 detects the period of time counted from the timing to start the cranking of the engine 10 to the timing to firstly ignite the fuel in the cylinder. When detecting that the detected period of time is larger than a predetermined judgment value, the ECU 40 judges that the starting-capability to start the engine 10 is decreased. The ECU 40 performs the dispersion control. It is thereby possible for the ECU 40 to perform the dispersion control when there is a high necessity to expand the degree of dispersion of the stop position in the rotation of the ring gear 22.

Further, the engine control system further has a means to detect the number of starting the engine 10. The ECU 40 performs the dispersion control based on the detection result of the means to detect the number of starting the engine 10. For example, when the above detected number is greater than a predetermined judgment value, the ECU 40 performs the dispersion control. The more the number of starting the engine 10 is increased, the more abrasion of the teeth of the ring gear 22 and the teeth of the pinion 33 is advanced.

It is also possible for the ECU 40 to perform the dispersion control every a predetermined number of starting the engine 10.

By the way, in the first embodiment as previously described, the ECU 40 performs the dispersion control to expand the stop position of the piston in the cylinder by opening or closing the valve immediately before the engine 10 is stopped.

On receiving the request to stop the engine 10 which is generated by the satisfaction of the condition to automatically stop the engine 10, that is, when the request to stop the engine 10 is generated by the idling stop control, it is possible for the ECU 40 to perform the control to open and close the valve before the engine 10 is stopped in order to increase the dispersion of the stop position of the piston.

Because the frequency to restart the engine 10 under the idling stop control is relatively high, it can be considered to advance abrasion of the ring gear 22 in mesh state with the pinion 33 in the engine control system having the idling stop control.

It is therefore possible for the ECU 40 to efficiently suppress abrasion of the ring gear 22 from being advanced by expanding the degree of dispersion of the stop position of the piston in the cylinder when the engine is stopped by the idling stop control.

It is possible for the ECU 40 to stop the rotation of the engine 10 without performing any stop position control of the piston in the cylinder when the request to stop the engine 10 is generated by satisfying the automatic engine stop condition.

In addition, it is also possible for the ECU 40 to perform the stop position control of the piston in the cylinder when the request to stop the engine 10 is generated by switching to off state of the IG switch 24. In this case, it is possible to increase the dispersion of the stop position of the piston by performing the control to open and close the valve before the engine 10 is stopped.

It is also possible for the ECU 40 to perform the dispersion control based on the state of charge in the battery 23. It is preferable for the ECU 40 to perform the stop position control of the piston in the cylinder in order to correctly restart the engine 10. That is, in the second embodiment, the ECU 40 performs the dispersion control of the stop position of the piston when the voltage of the battery 23 exceeds a predetermined judgment value. That is, when the battery is adequately charged, the ECU 40 permits to increase the period of time to start the engine 10, namely, to slowly start the engine 10 in order to suppress abrasion of the ring gear 22 from being advanced.

On the other hand, when the voltage of the battery 23 is lower than the predetermined judgment value, the ECU 40 does not perform any dispersion control of the stop position of the piston. That is, when the SOC of the battery 23 is low, there is a possibility of further decreasing the SOC of the battery when the period of time to start the engine 10 becomes long. In this case, the ECU 40 performs the starting-capability to start the engine 10 rather than the dispersion control of the stop position of the piston.

When the control of the stop position of the piston is performed based on at least one of: (x1) the request to stop the engine 10 is generated by switching to off state of the IG switch 24; and (x2) the request to stop the engine 10 is generated by satisfying the condition of the automatic engine stop, the ECU 40 increase the degree of dispersion of the stop position of the piston by dispersing a current target stop position of the piston from the stop position of the piston before the previous engine stop. This makes it possible to increase the dispersion of the stop position of the piston (the position to stop the part of the teeth of the ring gear 22 when the rotation of the ring gear 22 is stopped).

Specifically, for example, the ECU 40 sets the target stop position of the piston in the cylinder so that the stop position of the piston is averaged in a distribution range of the stop position of the piston obtained when the ECU 40 does not perform the dispersion control. The ECU 40 then sets the stop position of the piston to the target stop position.

When the rotation of the ring gear 22 is stopped, the ECU 40 performs the control to disperse the stop position of the ring gear 22 within the range of the distribution of the stop position when not performing the dispersion control. This makes it possible to set the stop position of the piston within the usual control range. This can suppress the stop position of the piston from being expanded to the range which decreases the starting-capability to start the engine 10 at the next restart of the engine 10. This can also increase the dispersion of the stop position of the piston in the cylinder (the stop position of the ring gear 22 when the rotation of the ring gear 22 is stopped).

In the second embodiment, for example, when the target stop position of the piston is the predetermined position PT1 and when the ECU 40 does not perform the dispersion control of the stop position of the piston, the ECU 40 sets the target position PT1 within the predetermined range around the predetermined position PT1. At this time, it is possible to set a different value as the target stop position of the piston every engine restart, or every day or month.

Figure 7:
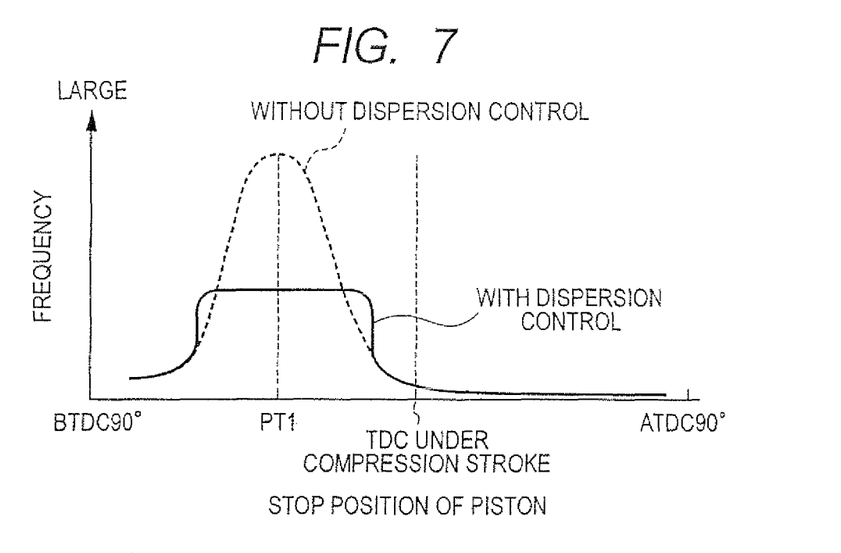
FIG. 7 is a view showing a relationship between the stop position of the piston and frequency of the stop position when a target position to stop the piston in the cylinder is changed.

FIG. 7 is a view showing one example of a relationship between the stop position of the piston and the frequency of the stop position when a target position to stop the piston in the cylinder is changed. In FIG. 7, the solid curve designates the stop position of the piston when the target stop position is dispersed, and the dotted curve indicates the stop position of the piston without performing the dispersion control of the stop position of the piston.

As shown in FIG. 7, it is possible for the ECU according to the second embodiment to disperse the stop position of the piston around the position in the crank angle near the predetermined position PT1 without concentrating the stop position of the piston to the predetermined position PT1.

By the way, in the first embodiment previously described, the engine control system is equipped with the starter 30 having the configuration to engage the pinion 33 with the ring gear 22 and to rotate the pinion 33 by switching on/off of the SL driving relay 25. The concept of the present invention is not limited by this configuration. For example, it is possible for the engine control system to have a starter capable of independently controlling the engagement process between the ring gear and the pinion, and controlling the rotation of the pinion. That is, the engine control system equipped with the ECU 40 as the engine control device further has the engagement control means and the rotation control means. The engagement control means engages the pinion with the ring gear during inertial rotation of the engine 10 after the engine 10 is stopped. The rotation control means rotates the pinion by the motor as the rotation driving means after the request to restart the engine.

Figure 8:
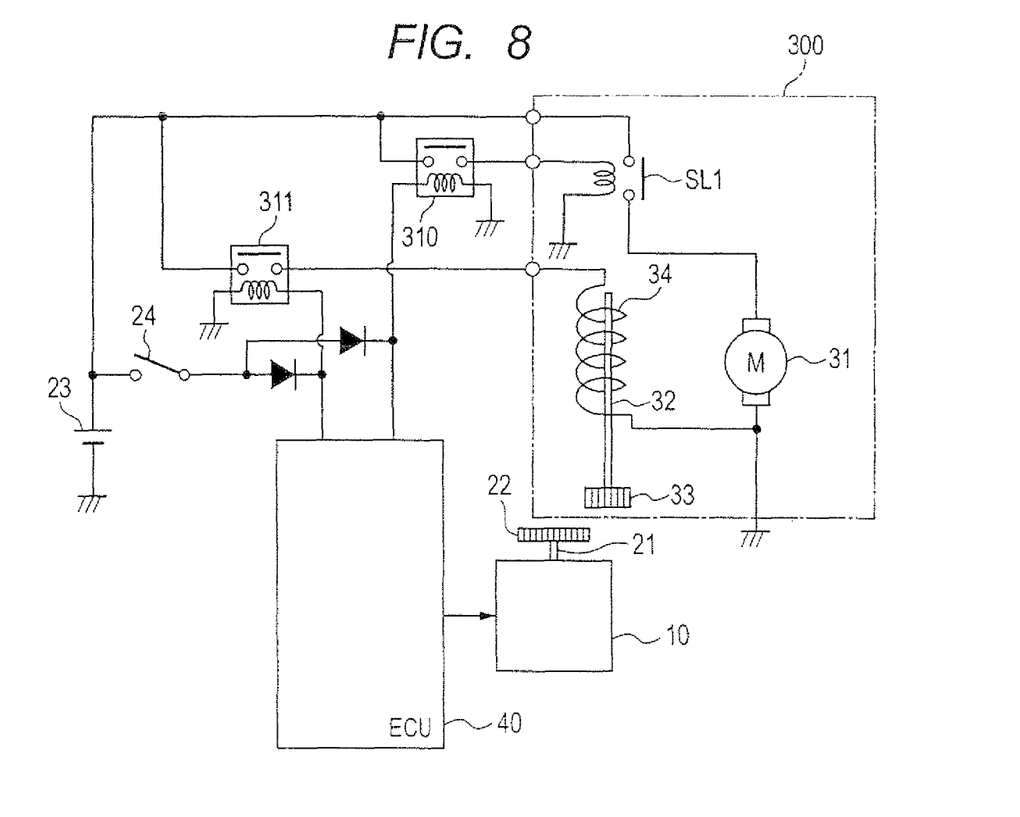
FIG. 8 is a view showing a schematic entire structure of an engine control system equipped with an engine control device according to a second embodiment of the present invention.

FIG. 8 is a view showing a schematic entire structure of the engine control system equipped with the engine control device having the above structure according to the second embodiment of the present invention.

Specifically, as shown in FIG. 8, the starter motor 300 has the motor switch unit SL1. Through the motor switch unit SL1 electric power is supplied to the motor 31. The motor switch unit SL1 is electrically connected to the SL1 driving relay 310 to turn on/off the motor switch unit SL1 based on a control signal transferred from the ECU 40. The coil 34 placed around the pinion shaft 32 is electrically connected to the SL2 driving relay 311 to turn on/off electric power to be supplied to the coil 34 based on a control signal transferred from the ECU 40.

When receiving a turning-on control signal transferred from the ECU 40, the SL2 driving relay 311 is turned on. The electric power is thereby supplied from the battery 23 to the coil 34. When the pinion shaft 32 is pushed to the ring gear 22, the pinion 33 and the ring gear 22 become in mesh state.

After this, when receiving the turning-on control signal transferred from the ECU 40, the SL1 driving relay 310 is turned on, the electric power is supplied from the battery 23 to the motor 31, and the pinion 33 starts to rotate. This initiates the cranking of the engine 10.

When the ECU 40 performs the process to engage the pinion 33 with the ring gear 22 after generating the request to restart the engine 10, it is possible for the ECU 40:

(y1) to control the stop position of the piston to the target stop position by engaging the pinion 33 with the ring gear 22 when the engine 10 is reversely rotated during inertial rotation of the engine 10 after the engine 10 is stopped; and (y2) to increase the dispersion of the stop position of the piston by setting the target stop position with adequate dispersion.

During an inertial rotation of the engine 10 after the engine 10 is stopped, the direction of rotation of the engine 10 is alternately changed between the forward rotation and the reverse rotation.

It is possible to rapidly stop the rotation of the engine 10 by engaging the pinion 33 with the ring gear 22 during the inertial rotation of the engine 10. Accordingly, the ECU 40 detects whether or not the engine 10 forwardly rotates or reversely rotates based on the output value of the crank angle sensor 26, for example. When the detection result indicates the reverse rotation of the engine 10, the ECU 40 performs the engagement between the pinion 33 and the ring gear 22 at the timing when the position of the piston reaches the target stop position. This makes it possible to perform the stop position control of the piston in the cylinder with high accuracy, and further to efficiently perform the dispersion control of the stop position of the piston (as the dispersion control of the stop position of the teeth of the ring gear 22).

According to the second embodiment of the present invention, it is possible to suppress abrasion of the teeth of the ring gear 22 from being advanced, which is caused by collision of the teeth of the pinion 33 with the teeth of the ring gear 22 when the pinion 33 starts to be rotated by the motor 31.

When the ECU 40 performs the stop position control of the piston based on the timing to engage the pinion 33 with the ring gear 22, it is possible to adjust the stop position of the piston by adjusting the quantity of the reverse rotation of the engine 10. When the quantity of the reverse rotation of the engine 10 is large, it is possible to relatively increase the dispersion of the stop position of the piston by setting various timings to engage the pinion 33 with the ring gear 22. This configuration of the engine control system can expand the dispersion of the stop position of the piston (namely, the stop position of the ring gear 22 at which the rotation of the teeth of the ring gear 22 is stopped).

The quantity of the reverse rotation of the engine 10 varies according to the degree of decreasing the rotation speed of the engine 10 during the inertial rotation of the engine 10 is stopped, and the inertial force of the engine 10. For example, the more the degree of decreasing the rotation speed of the engine during the inertial rotation of the engine 10 is increased, the more the quantity of the reverse rotation of the engine increases. Accordingly, it is possible to increase the degree of decreasing the rotation speed of the engine 10 during the inertial rotation of the engine 10 in order to increase the quantity of the reverse rotation of the engine 10.

The degree of decreasing the rotation speed of the engine 10 during the inertial rotation is controlled by adjusting the compression load of the cylinder or the rotation load of the output shaft of the engine 10. Specifically, for example, the ECU 40 instructs the throttle valve 13 to open at a predetermined degree during the inertial rotation of the engine 10. When the ECU 40 instructs the throttle valve 13 to open, the variation of instant rotation speed of the engine 10 becomes increased by the reciprocating motion of the piston. As a result, this increases the reverse rotation of the engine 10.

By the way, in the configuration of the engine control system equipped with the ECU 40 as the engine control device according to the first embodiment previously described, the intake valve 17 and the exhaust valve 18 are mechanically opened and closed according to the rotation of the cam which is rotated by the rotation of the engine 10. The concept of the present invention is not limited by this. For example, it is also possible to use the intake valve and the exhaust valve of a magnetic type to be opened and closed by electromagnetic solenoid.

When the intake valve and the exhaust valve of a magnetic type are used, it is possible to independently control the operation of the intake valve and the exhaust valve mounted to each cylinder. An electromagnet is mounted to each cylinder, and at least one of the intake valve and the exhaust valve of each cylinder is opened before the engine 10 is stopped. It is possible to open a part of the valves in the intake valves and the exhaust valves of all of the cylinders. It is preferably to open the intake valves and the exhaust valves for all of the cylinders in the engine 10. This makes it possible to more increase the dispersion of the stop position of the piston. As a result, it is possible to efficiently suppress abrasion on the teeth of the ring gear 22 from being partially generated and advanced.

In the configuration of the engine control system equipped with the ECU 40 as the engine control device according to the first embodiment previously described, the ECU 40 adjusts the compression load of the cylinder in the compression stroke when the engine 10 is stopped by opening the intake valve 17 of the cylinder at the TDC in the compression stroke. It is also possible for the ECU 40 to instruct the exhaust valve 18 to be opened, instead of the intake valve 17, or in addition to the intake valve 17.

Further, it is possible for the ECU 40 to adjust the compression load of the cylinder in the compression stroke when the engine 10 is stopped by performing the opening/closing control of the throttle valve 13. Specifically, in the state to close the throttle valve 13, because the quantity of intake air to be introduced into a combustion chamber is low when compared with that of the case to open the throttle valve 13, the compression load of the cylinder in the compression stroke is more small.

In addition, when the compression load of the cylinder becomes small, it is possible to disperse the stop position of the piston in the cylinder around an intermediate point between the TDC and the BDC when the engine 10 is stopped. Accordingly, it is possible to increase the degree of dispersion of the stop position of the piston by closing the throttle valve 13 when the engine 10 is stopped.

It is further possible to have a configuration to increase the degree of dispersion of the stop position of the piston by controlling the load of the alternator instead of the control, instead of or in addition to the control to increase the degree of dispersion of the teeth of the ring gear facing the teeth of the pinion by controlling the opening and closing valves (intake valve 17, exhaust valve 18, and throttle valve 13).

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalents thereof.

What is claimed is:

1. An engine control device capable of performing cranking of an internal combustion engine in mesh state between a ring gear and a pinion, the ring gear being connected to an output shaft of the internal combustion engine and the pinion of a starter driving the internal combustion engine when the internal combustion engine starts to rotate, where the ring gear faces the pinion of the starter, and the engine control device is capable of releasing the mesh state between the ring gear and the pinion after completion of the cranking, the engine control device comprising:

dispersion control means capable of performing dispersion control to increase a degree of dispersion of a mesh portion of the ring gear with which a mesh portion of the pinion is meshed together when a rotation of the ring gear is stopped according to the stop of the operation of the internal combustion engine, and target setting means capable of setting a target mesh portion of the ring gear to face the pinion based on a previous mesh portion of the ring gear obtained by a previous engine stop prior to the last engine stop, wherein the dispersion control means is capable of performing the dispersion control to increase the degree of dispersion of the mesh portion of the ring gear by setting the target mesh portion to the mesh portion of the ring gear which faces the pinion.

2. The engine control device according to claim 1, wherein the dispersion control means is capable of performing the dispersion control to increase the degree of dispersion of the mesh portion of the ring gear facing the pinion by enlarging a distribution of the mesh portion of the ring gear when compared with the mesh portion of the ring gear without performing the dispersion control.

3. The engine control device according to claim 1, wherein the dispersion control means is capable of performing the dispersion control to increase the degree of dispersion of the mesh portion of the ring gear by adjusting a compression load of a cylinder under a compression stroke when the internal combustion engine is stopped.

4. The engine control device according to claim 3, wherein the cylinder of the internal combustion engine has an intake valve and an exhaust valve capable of adjusting a quantity of fuel gas to be supplied into the cylinder as a combustion chamber of the internal combustion engine.

5. The engine control device according to claim 1, further comprising:
   mesh control means capable of meshing the pinion with the ring gear during inertial rotation of the internal combustion engine after the internal combustion engine is stopped; and
   rotation control means capable of rotating the pinion by rotation drive means after receiving a request to start the internal combustion engine,
   wherein the dispersion control means is capable of performing the dispersion control to set the target mesh portion to the mesh portion of the ring gear when the mesh control means meshes the pinion to the ring gear during reverse rotation in inertial rotation of the internal combustion engine.

6. The engine control device according to claim 1, further comprising starting-capability detection means capable of detecting decreasing of ability to start the internal combustion engine,
   wherein the dispersion control means is capable of performing the dispersion control when the starting-capability detection means detects decreasing of ability to start the internal combustion engine.

7. An engine control device capable of performing cranking of an internal combustion engine in mesh state between a ring gear and a pinion, the ring gear being connected to an output shaft of the internal combustion engine and the pinion of a starter driving the internal combustion engine when the internal combustion engine starts to rotate, where the ring gear faces the pinion of the starter, and the engine control device is capable of releasing the mesh state between the ring gear and the pinion after completion of the cranking, the engine control device comprising:
   dispersion control means capable of performing dispersion control to increase a degree of dispersion of a mesh portion of the ring gear with which a mesh portion of the pinion is meshed together when a rotation of the ring gear is stopped according to the stop of the operation of the internal combustion engine, wherein:
   the internal combustion engine has an automatic engine stop and restart function capable of automatically stopping the operation of the internal combustion engine when a predetermined automatic engine stop condition is satisfied, and automatically start the internal combustion engine by performing the cranking of the internal combustion engine by the starter,
   the engine control device further comprises request judgment means capable of judging whether the request to stop the internal combustion engine is generated by the satisfaction of the predetermined automatic engine stop condition or a system start other than the automatic engine stop and restart function, and
   the dispersion control means is capable of performing the dispersion control based on the judgment result of the request judgment means.

8. An engine control device capable of performing cranking of an internal combustion engine in mesh state between a ring gear and a pinion, the ring gear being connected to an output shaft of the internal combustion engine and the pinion of a starter driving the internal combustion engine when the internal combustion engine starts to rotate, where the ring gear faces the pinion of the starter, and the engine control device is capable of releasing the mesh state between the ring gear and the pinion after completion of the cranking, the engine control device comprising:
   dispersion control means capable of performing dispersion control to increase a degree of dispersion of a mesh portion of the ring gear with which a mesh portion of the pinion is meshed together when a rotation of the ring gear is stopped according to the stop of the operation of the internal combustion engine, wherein:
   the internal combustion engine has an automatic engine stop and restart function capable of automatically stopping the operation of the internal combustion engine when a predetermined automatic engine stop condition is satisfied, and automatically start the internal combustion engine by performing the cranking of the internal combustion engine by the starter,
   the engine control device further comprises request judgment means capable of judging whether the request to stop the internal combustion engine is generated by the satisfaction of the predetermined automatic engine stop condition or a system start other than the automatic engine stop and restart function,
   the dispersion control means is capable of performing the dispersion control based on the judgment result of the request judgment means, and
   the engine control device is capable of performing a stop position control to stop the piston in the cylinder under the compression stroke when the judgment result of the request judgment means indicates the request to stop the internal combustion engine is generated by the satisfaction of the predetermined automatic engine stop condition.

* * * * *